United States Patent [19]
Heitzman

[11] 3,754,485
[45] Aug. 28, 1973

[54] CIRCULAR SAW TENSIONING METHOD AND APPARATUS

[76] Inventor: Russell A. Heitzman, 826 Story, McMinnville, Oreg.

[22] Filed: Dec. 30, 1971

[21] Appl. No.: 214,020

[52] U.S. Cl. ............................................... 76/112
[51] Int. Cl. .......................................... B23d 65/00
[58] Field of Search ................... 76/112, 26; 83/676

[56] References Cited
UNITED STATES PATENTS
2,004,174  6/1935  Remington .................... 76/112 X
316,659  4/1885  Presser .......................... 76/112

*Primary Examiner*—Leonidas Vlachos
*Attorney*—Eugene D. Farley

[57] ABSTRACT

Circular saws having faces of unequal tension and which accordingly will not saw true are tensioned by selectively heating a central area of the saw, thereby causing the saw to dish. Taking advantage of the fact that the more highly tensioned face of the saw is the concave face thereof, the tension then is equalized by hammering the convex face thereof in areas and with an intensity sufficient to equalize the tension in both faces.

7 Claims, 3 Drawing Figures

PATENTED AUG 28 1973

3,754,485

Russell A. Heitzman
INVENTOR
BY Eugene O. Farley
Atty.

CIRCULAR SAW TENSIONING METHOD AND APPARATUS

This invention relates to a method for tensioning circular saws and to apparatus for use therein.

It is a common occurrence for the opposite faces of circular saws, particularly the large circular saws used in commercial gang edgers, to be in a condition of unequal tension. In such a case, as the saws heat during use, they assume a distorted, dished configuration. The saws thereupon become instantly deformed to a point where they no longer will saw straight lines. The natural results of this are the production of substandard sawn lumber, broken saws, and the necessity of making frequent saw changes.

Prior to its application to the sawing operation, it is very difficult to determine whether a given saw is in a condition of unequal tension. The only means of testing heretofore have been the use of straight edges and tension gauges applied first to one saw face and then to the other. An accurate test is impossible using these devices since the readings are dependent upon such variable factors as light conditions, and the skill and visual acuity of the operator.

Also, the results are obtained by comparison of readings made first on one side and then on the other. Since it is impossible to see both faces of the saw at the same time, the memory of the operator determines the conclusion reached, and this is a factor of doubtful accuracy.

The method of the present invention takes advantage of the fact that the direction of bending of a circular saw when a central area thereof is heated provides an accurate indication of which face of the saw is over tensioned. Knowing this, it is a simple matter to correct the overtensioned face by hammering selected areas of the saw.

The method of accomplishing this result, and the apparatus employed in the practice of the method, are illustrated in the drawings wherein.

Figure 1:
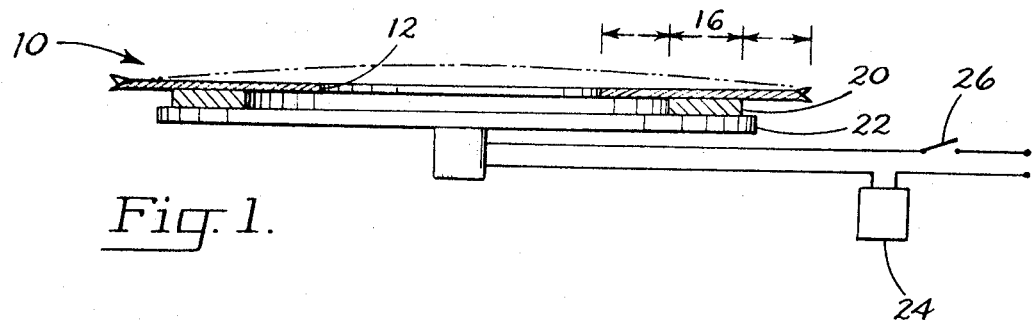
FIG. 1 is a sectional view.
Figure 2:
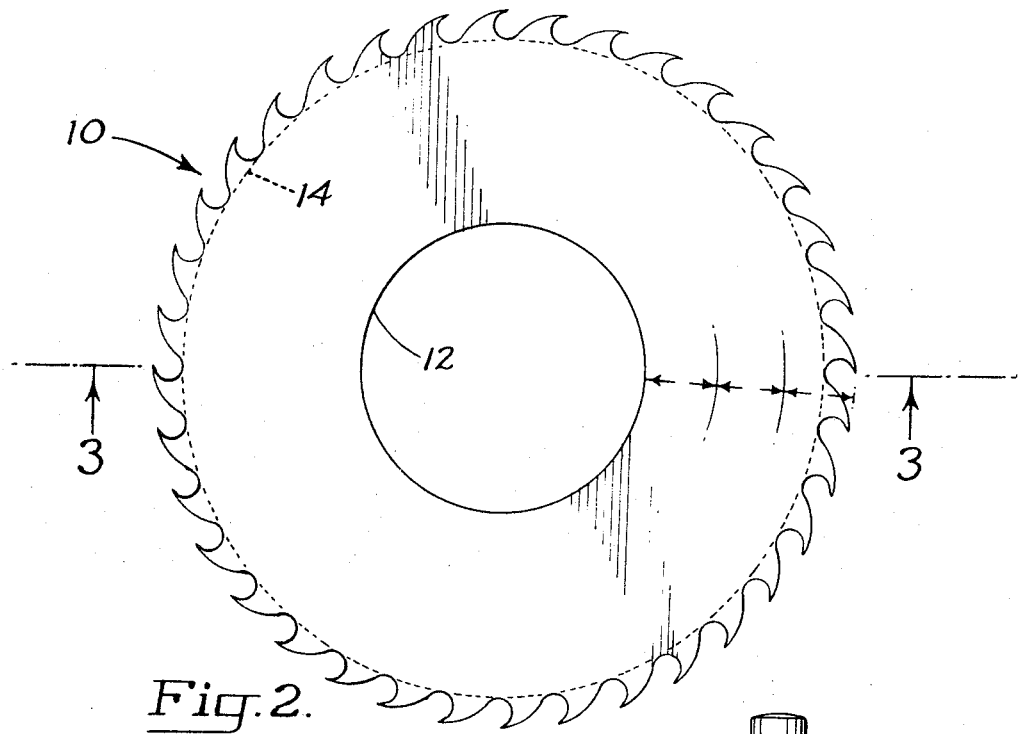
FIG. 2 is a plan view of a circular saw illustrating the application of the herein described method and apparatus in determining which face of the saw is the more highly tensioned.
Figure 3:
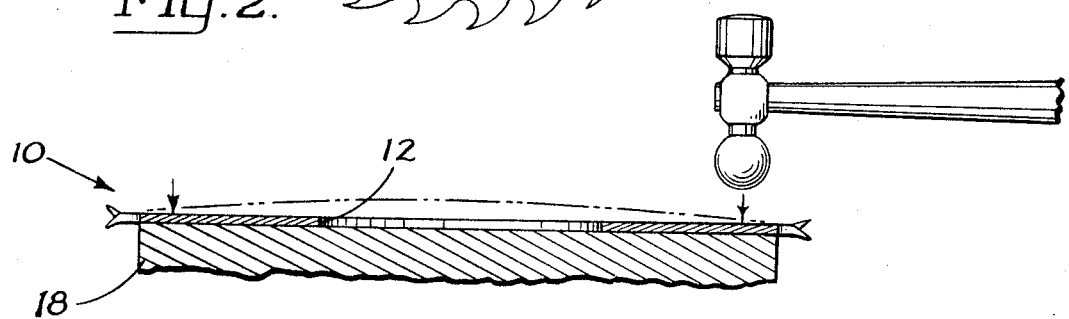
FIG. 3 is a schematic view illustrating the manner of relieving the tension in the more highly tensioned face of the saw.

In the execution of the herein described method, a circular saw 10 having opposite faces which are unequally tensioned is selectively heated in a central area. This area preferably comprises the central one-third of the saw, radially considered. In other words, as is shown in FIGS. 1 and 2, if a radial line be drawn through the saw, from the edge of the saw eye 12 through the gullet line 14, and such line be divided into three equal divisions, the central division swept about the saw through 360° defines the annular saw area 16 concerned.

The heating of the central annular area is continued at a predetermined rate until such area has been heated sufficiently to establish a heat differential with the remaining saw areas. This differential must be sufficient to cause the saw to assume a distorted concavo-convex configuration. Two factors are concerned in the heating process.

First the temperature must be sufficiently elevated to produce the desired effect. I have found that the desired result is obtained where the central, annular area is heated to a temperature of from 400°–500° F. and maintaining the remaining areas at a temperature level of not substantially above 250° F.

The second factor is the magnitude of heat input. Keeping in mind that saws are made of steel, which is a heat conductive material, the heat should be supplied in a quantity sufficient to raise the temperature of the central annular area at a rapid rate so that it attains the desired temperature level before the inner and outer areas of the saw become too hot. This establishes the requisite temperature differential.

When the central area of a saw having unevenly tensioned faces is selectively raised to an elevated temperature in this manner, the saw immediately becomes dished in configuration. The more highly tensioned face of the saw invariably becomes the concave face thereof. The operator thus can see at a glance which of the faces requires tension relief.

Knowing this, he can take appropriate steps to equalize the tension on both faces. This is done by cooling the saw until it reassumes its original condition of substantial flatness. The saw then is placed flat, horizontally on an anvil 18 with the face arranged outwardly which was formerly the convex face thereof when the saw was in its heated, distorted condition. The operator then hammers the formerly convex face of the saw areas and with an intensity calculated to relieve the tension in the over-tensioned face thereof, i.e. the formerly concave face. In so doing, advantage is taken of the characteristic property of unequally tensioned planar metal objects that the tension on one face may be relieved by hammering on the opposite face.

Thus all that is required to correct the condition is a few appropriately placed blows of a hammer in selected areas of the saw.

Various means may be employed for heating the central annular area as required to test the saw tension. Such means may comprise flames applied to the area, or heating appliances fired with combustible fuels.

For reasons of convenience and accuracy, it is preferred to use an electrically heated appliance such as is illustrated in FIGS. 1 and 2.

The heating element comprises a ring 20 which may be fabricated to advantage from heavy cast iron. It preferably is rectangular in cross-section. In any event, it has a contact surface which is codimensional and registrable with the central annular area of the saw face which it is desired to heat selectively.

Ring 20 is heated by means of an associated heating element 22. This may comprise a chromalox or other suitable heating element supplied with electricity through a circuit including a temperature control element 24 and a switch 26.

The heating apparatus thus constituted is placed on an appropriate support. It is heated to the desired temperature level and the saw carefully positioned so that the desired saw area contacts the hot ring. If the saw remains flat upon being heated, a condition of uneven tension does not exist. However, if it becomes dished, as indicated by the dotted line position of FIG. 1, a condition of uneven tension is present. This then may be remedied by transferring the saw to a suitable anvil surface and hammering it, in the manner described above.

Significant advantages accrue from the practice of the presently described method. Most importantly, the tensioned condition of saws may be tested accurately and rapidly even by a relatively unskilled operator. If a condition of uneven tension is present, it may be remedied with equal facility without damage to the saw.

As a consequence, the saws saw straight and true and the quality and output of lumber are correspondingly improved. In a typical installation, the output of a gang edger in a given time period may be nearly doubled when the edger saws are tensioned in the manner described herein.

Having thus described my invention in preferred embodiments, I claim:

1. A circular saw tensioning method which comprises
   a. selectively heating a central area of a circular saw the opposite faces of which are unequally tensioned,
   b. continuing the heating at a predetermined rate until there has been established a heat differential between the central and the remaining saw areas sufficient to cause the saw to assume a distorted, concavo-convex configuration,
   c. the more highly tensioned face of the saw being the concave face thereof, and
   d. hammering the convex face of the saw in areas and with an intensity sufficient to equalize the tension in the opposed saw faces.

2. The method of claim 1 including the steps of cooling the heated saw until it re-assumes its original condition of substantial flatness, placing the saw on an anvil with the face arranged outwardly which was the formerly convex face thereof when the saw was in its heated, distorted condition, and thereafter hammering the said formerly convex face in areas and with an intensity sufficient to equalize the tension in the opposed saw faces.

3. The method of claim 2 wherein the saw area selectively heated comprises a central annular area comprising substantially the central one-third of the saw, radially considered on a radial line extending from the eye of the saw to the gullet line thereof.

4. The method of claim 2 wherein the central area of the saw is heated to a temperature of from 400°–500° F. while the remaining areas of the saw are maintained at a temperature not substantially above 250° F.

5. The method of claim 2 wherein the central area of the saw is heated by contacting it with a hot ring of heat conductive material.

6. In the method of tensioning circular saws the opposite faces of which are unequally tensioned, the step of determining which face has the greater tension, comprising:
   a. selectively heating a central annular area of the saw, and
   b. continuing the heating at a predetermined rate until the said central annular area has been heated sufficiently to establish a heat differential with the remaining saw areas sufficient to cause the saw to assume a distorted, concavo-convex configuration,
   c. the more highly tensioned face of the saw being the concave face thereof.

7. The method of claim 6 wherein the central annular area of the saw comprises substantially the central one-third thereof, radially considered, and wherein the said central one-third is heated to a temperature of substantially 400°–500° F. while maintaining the remaining areas of the saw at a temperature not substantially above 250° F.

* * * * *